US 7,458,825 B2

(12) United States Patent
Atsmon et al.

(10) Patent No.: US 7,458,825 B2
(45) Date of Patent: Dec. 2, 2008

(54) DOUBLE-SIDED USB-COMPATIBLE PLUG CONNECTOR ADAPTED FOR INSERTION IN EITHER ORIENTATION INTO A USB-COMPATIBLE RECEPTACLE

(75) Inventors: Alon Atsmon, Yehud (IL); Yuval Dahan, Herzliya (IL); Abraham Dahan, Rishon Lezion (IL)

(73) Assignee: Walletex Microelectronics Ltd., Rishon Lezion (IL)

( * ) Notice: Subject to any disclaimer, the term of this patent is extended or adjusted under 35 U.S.C. 154(b) by 10 days.

(21) Appl. No.: 11/629,870

(22) PCT Filed: Jun. 17, 2005

(86) PCT No.: PCT/IL2005/000647

§ 371 (c)(1),
(2), (4) Date: Dec. 18, 2006

(87) PCT Pub. No.: WO2005/124932

PCT Pub. Date: Dec. 29, 2005

(65) Prior Publication Data

US 2007/0243769 A1    Oct. 18, 2007

Related U.S. Application Data

(60) Provisional application No. 60/675,450, filed on Apr. 28, 2005, provisional application No. 60/628,692, filed on Nov. 18, 2004, provisional application No. 60/614,393, filed on Sep. 30, 2004, provisional application No. 60/580,573, filed on Jun. 17, 2004.

(51) Int. Cl.
*H01R 12/00* (2006.01)
*H01R 29/00* (2006.01)

(52) U.S. Cl. ........................ 439/78; 439/188

(58) Field of Classification Search ................ 439/352, 439/59, 88, 181, 492, 507–514, 78, 188, 439/218, 626, 633; 361/737, 785
See application file for complete search history.

(56) References Cited

U.S. PATENT DOCUMENTS

| 4,607,209 | A | * | 8/1986 | Guim et al. ............... 320/105 |
| 4,781,610 | A | * | 11/1988 | Mercer .................... 439/217 |
| 5,387,110 | A |   | 2/1995 | Kantner et al. |
| 5,518,416 | A |   | 5/1996 | Kantner et al. |
| 6,283,776 | B1 | * | 9/2001 | Gressly et al. ............. 439/188 |
| 6,813,164 | B2 |   | 11/2004 | Yen |

(Continued)

FOREIGN PATENT DOCUMENTS

EP            358953  A2    3/1990

(Continued)

*Primary Examiner*—Chandrika Prasad
(74) *Attorney, Agent, or Firm*—Browdy and Neimark, P.L.L.C.

(57) ABSTRACT

A double-sided male USB connector and various card-shaped devices having one or more male USB connectors, which may be single or double sided and are dimensioned to fit into a USB receptacle. When provided with a double sided connector, electronics may be provided to prevent short circuit. The device can have rechargeable power source that is fed power via the connector's power lines. The device can be manufactured from flexible material using a lamination process and may be configured to communicate with a broad variety of other electronic devices.

24 Claims, 16 Drawing Sheets

U.S. PATENT DOCUMENTS

| | | |
|---|---|---|
| 6,900,988 B2 | 5/2005 | Yen |
| 2004/0033726 A1 | 2/2004 | Kao |
| 2004/0102093 A1 | 5/2004 | Huang |
| 2005/0079738 A1 | 4/2005 | Ahn |

FOREIGN PATENT DOCUMENTS

| | | |
|---|---|---|
| EP | 1278273 A2 | 1/2003 |
| KR | 20030060691 | 7/2003 |
| WO | 0148994 A1 | 7/2001 |
| WO | 0169881 A2 | 9/2001 |
| WO | 02056427 A2 | 7/2002 |
| WO | 03027946 A1 | 4/2003 |

* cited by examiner

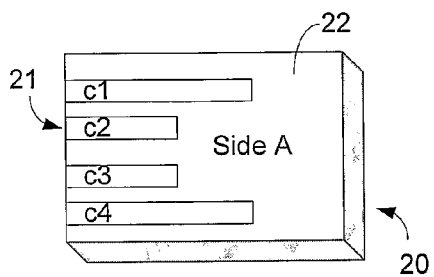
FIG. 2a
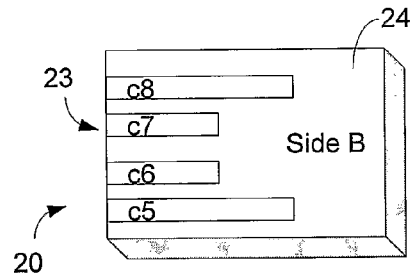
FIG. 2b
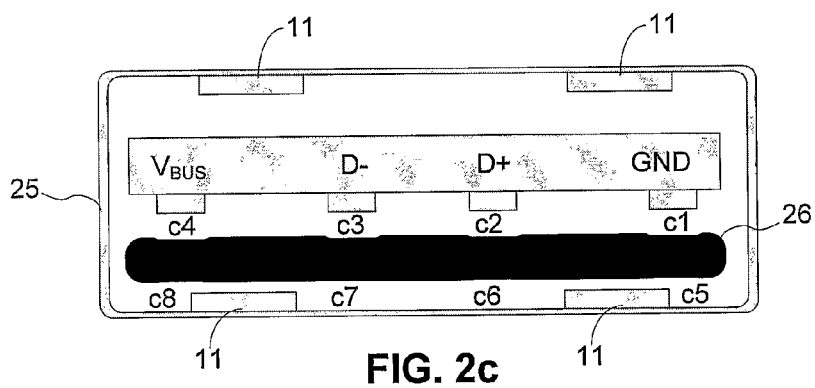
FIG. 2c
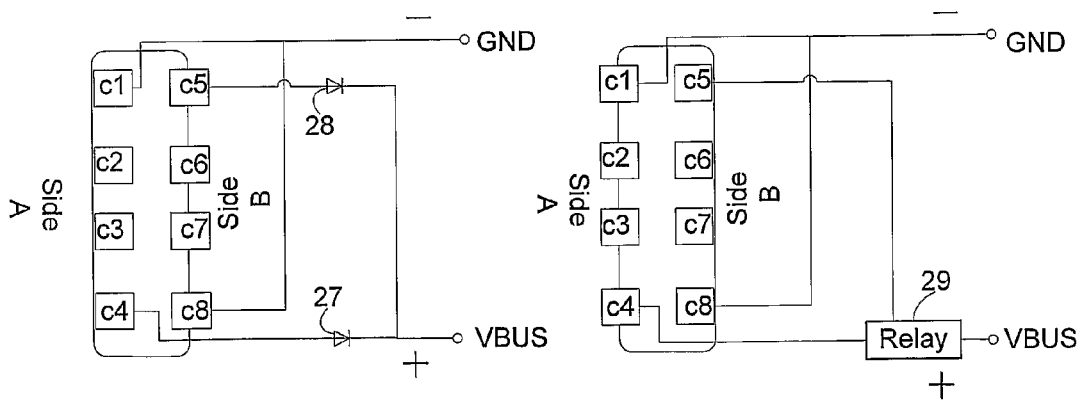
FIG. 2d  FIG. 2e

Top View

Cross sectional View

DOUBLE-SIDED USB-COMPATIBLE PLUG CONNECTOR ADAPTED FOR INSERTION IN EITHER ORIENTATION INTO A USB-COMPATIBLE RECEPTACLE

FIELD OF THE INVENTION

This invention relates to electrical connectors.

BACKGROUND OF THE INVENTION

Plastic data cards are well known and include ATM card, credit cards, employee card and so on. Advances in technology have increased the data and processing capacity of such devices and rendered them more compact.

USB devices are also common and are used for peripheral devices such as a mouse, a keypad, a printer and similar devices. USB tokens are widely used as means to store, retrieve and transfer information from one computer to another. Other tokens are used to authenticate a user, or to create digital signature. Various versions of self-powered card are emerging.

WO 0169881 (Drabczuk et al.) published Sep. 20, 2001 and entitled "Method of communication between a smart card and a host station" discloses a card-like portable article having a microcontroller that communicates in accordance with a first communication protocol and a USB interface for converting commands in accordance with the first communication protocol into commands in accordance with a second communication protocol and vice versa.

WO 03027946 (Elbaz et al.) published Apr. 3, 2003 and entitled "Dongle which is intended to be connected to a port of a telecommunications device" describes an electronic key device manufactured using chip card manufacturing techniques and having a USB connector.

U.S. Pat. Nos. 6,813,164 and 6,900,988 (Yen) published Feb. 12, 2004 and entitled "Low height USB interface connecting device and a memory storage apparatus thereof" describes a connecting device with a low height that comprises a connector part, and a set of metal terminals. The connector part has a height compatible with the height of an inner space in a standard USB interface slot socket so as to be inserted into the standard USB interface slot socket.

US 2004/0033726 (Kao) published Feb. 19, 2004 and entitled "Plug used for connection with a USB receptacle" describes a plug used for connection with a USB receptacle. The plug contains a plurality of metal contacts for contacting metal contacts of the USB receptacle when the plug is connected thereto. The plug has a thickness that is smaller than an ordinary USB plug, so it can be utilized by computer peripherals that have a thickness less than an ordinary USB plug.

US 2004/0102093 (Huang) published May 27, 2003 and entitled "Electronic device having a USB connector" describes an electronic device having a circuit board and a USB connector mounted on the circuit board. The USB connector includes a body portion, at least one contact pad, and a frame, in which the body portion is integrally formed on the circuit board and the contact pad is formed on the body portion, and the frame is attached to the body portion and mounted on the circuit board in a manner of surrounding the body portion.

WO 0148994 published Jul. 5, 2001 and entitled "Method and circuit for protection of a universal serial bus transceiver against short circuit" describes means to protect a USB circuit against short circuit using a comparison circuit configured to detect a shortcut to one or more predetermined voltage sources. Such an approach requires dedicated software to compare drive and transmit signals.

FIG. 1 shows a typical prior art USB connector assembly comprising a female part (receptacle) that is generally in the form of a rectangular outer frame 10 having internal resilient leaves 11 that press against the outer surface of a complementary male USB connector thereby maintaining the two connectors tightly coupled. A contact strip shown as 12 has depending therefrom four primary electrical contacts $V_{BUS}$, D−, D+ and GND for connecting thereto the positive voltage rail, positive and negative data lines and ground, respectively. A shaped slot 13 accommodates a complementary shaped protrusion of the male USB connector, which has a rectangular outer frame 14 such that peripheral contacts on an outer surface thereof engage the corresponding contacts on the connector strip 12. The connector strip 12 is closer to the upper edge of the frame 10 of the receptacle than to its lower edge. Consequently, the male USB connector can be entered in one orientation only.

FIG. 1 is not drawn to scale and in practice both the male and female USB connectors offer a very narrow profile so that it is not easy at first glance to determine in which orientation to hold the male USB connector prior to inserting it into the receptacle, this difficulty being compounded when the receptacle is not easily visible as is often the case when USB ports are accessed from a rear of the computer.

As the industry progresses towards reducing the thickness and increasing the portability of the discussed USB tokens several problems arise:

1. It is often difficult to insert card size tokens having USB plugs into USB receptacles. For example other devices may be already plugged nearby, and laptops may not have enough space between the USB receptacle and the table for the length of the card.
2. The prevailing manufacturing method for current tokens is assembly which suits thicker devices. While it is known that thin devices may be manufactured using a milling process, the resulting size of the device limits the capacity of the electronic circuitry that can be supported thereby.
3. Cards having USB plugs offer a very narrow profile and owing to the fact that they are not maintained asymmetrically within a surrounding frame as described above with reference to FIG. 1 they can be physically inserted in either direction into the USB receptacle. Of course, if the card is inserted incorrectly, the USB contacts of the card will engage the complementary contacts of the receptacle. But worse than this there exists then the danger that the USB $V_{BUS}$ contacts of the card will contact the resilient leaves 11 which are usually metallic and are coupled to GND via the rectangular frame to which they are connected. This would cause the $V_{BUS}$ contacts to short to GND and must be avoided.

Turning to card-like devices, present credit card sized devices having an internal battery do not include means for recharging the battery and are hence limit to either low current electronics, short usage time or both.

USB is an acronym for Universal Serial Bus, which has been become the universal standard for connecting peripherals to computer motherboards. Although the invention will be described with particular reference to the USB standard, it is to be understood that the principles of the invention are equally applicable to other standards and particularly to connectors having different contact arrangements than the USB standard. It is therefore to be understood that the invention both as described and as claimed is not intended to be limited to any specific standard and the more generic term "flexibly connectable computer systems" abbreviated as FCCS will be used to denote any interface standard for allowing devices to be connected to a computer.

There is therefore a need for a male FCCS connector that can be inserted either way into a FCCS receptacle so as to overcome the constraints of known connectors such as USB connectors.

SUMMARY OF THE INVENTION

It is therefore an object of the invention to provide a male FCCS connector that can be inserted either way into a FCCS receptacle.

A further objective is to provide a male FCCS connector that is insertable into a FCCS receptacle without causing a short circuit. Preferably such a male FCCS connector can be inserted either way into the FCCS receptacle.

This object is realized in accordance with one aspect of the invention by a double sided FCCS connector capable of being connected to a FCCS receptacle connector from two opposing sides.

In accordance with an aspect of the invention there is provided a multi-contact connector supporting on opposite surfaces first and second sets of contacts wherein corresponding contacts in each set are spatially aligned in anti-phase relationship allowing the connector to be connected in two opposed orientations to a corresponding multi-contact data connector having only a single set of contacts that is compatible to either one of said set of contacts.

In accordance with another aspect of the invention there is provided a multi-contact male connector having a planar substrate from which there protrudes two sets of contacts, each set being spatially disposed relative to the planar substrate in a mutually asymmetrical relationship so as to allow connection to a corresponding female connector in two different orientations of the male data connector.

The connectors are preferably FCCS-compatible and may be USB-compatible or mini-USB compatible connectors, for example.

In accordance with a preferred embodiment of the invention, there is disclosed a card like device that may be interfaced with an apparatus, such as a computer, via a double sided FCCS connector according to the invention.

Preferably, at least one of the FCCS connectors in such a device has means to prevent an electric short circuit between opposite sides of the connector.

According to one preferred embodiment, such a device has a length of at least 35 mm, a width of at least 40 mm and a thickness of less than 2.5 mm and is joined to one or more FCCS connectors each having a length of less than 13 mm, a width greater than 3 mm and a thickness of less than 2.7 mm but more than 1 mm.

According to another preferred embodiment, at least one of the FCCS connectors is a Mini FCCS connector having length of less than 6 mm, width greater than 3 mm and thickness of less than 1.1 mm but more than 0.3 mm.

In a variation of such an embodiment, the device is flexible, removable, produced using a lamination process and is adapted for carrying on the human body.

A FCCS receptacle for use with the double sided male FCCS connector of the invention preferably has an insertion space with longitudinal dimension of less than 1 mm.

Thus a device having a double sided male FCCS according to the invention can be connected to a FCCS receptacle from upper and lower sides whereby if it is not possible to connect the FCCS connector from one side, the device can be inverted.

Alternatively, if the device has multiple connectors, if it is not possible to connect using one FCCS connector, the device may be connected using another of its FCCS connectors.

Preferably, the device operates from power supplied via the $V_{BUS}$ and GND contacts of the FCCS receptacle connector.

Preferably the device includes a rechargeable battery that may be recharged using the power supplied via the FCCS receptacle connector.

Preferably, the device is lightweight and flexible and may also include standard smart card elements.

The double sided connector according to the invention is less likely to get scratched by FCCS receptacle.

The device can be manufactured at low cost and may be sufficiently compact to fit in a user's wallet. Alternatively, it can be included within a watch, a bracelet or a necklace and is able to communicate with a variety of other devices.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

In order to understand the invention and to see how it may be carried out in practice, some preferred embodiments will now be described, by way of non-limiting example only with regard to USB connectors, with reference to the accompanying drawings, in which:

FIGS. 2a to 2e illustrate several views of a double sided USB connector according to various embodiments of the invention;

FIGS. 2a and 2b illustrate a perspective view of a method to preventing electric short circuit between the anode and the cathode;

DETAILED DESCRIPTION OF EXEMPLARY EMBODIMENTS

Figure 1:
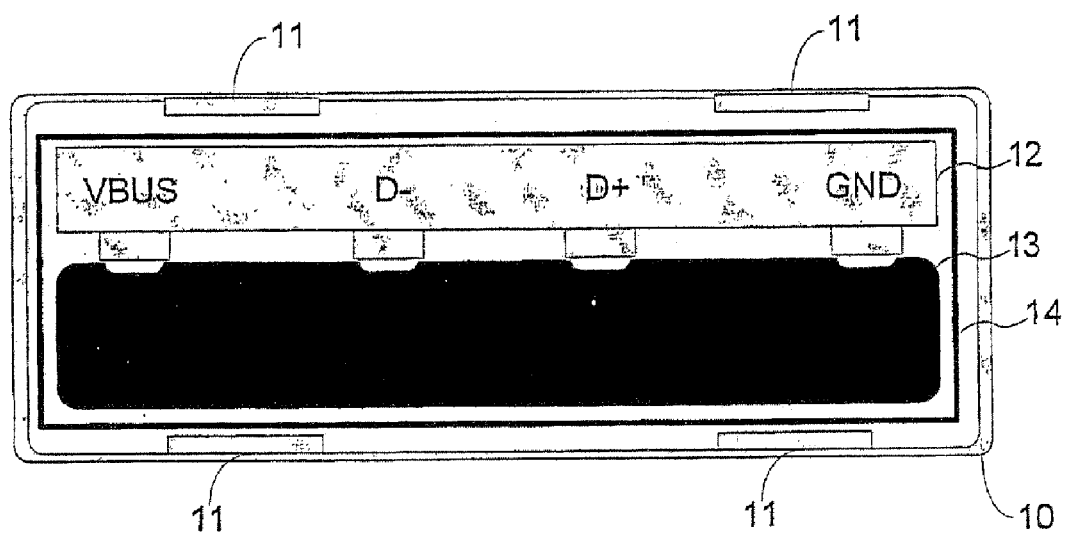
FIG. 1 shows pictorially a typical prior art USB receptacle.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in virtually any appropriately detailed system, structure or manner.

In the figures and the description relating thereto, identical references numerals are used to denote components that appear in more than one figure and are functionally equivalent.

FIGS. 2a and 2b show schematically opposing surfaces respectively of a double sided male USB connector 20 according to the invention having a first contact strip 21 on a first surface 22 (Side A) and a second contact strip 23 on a second surface 24 (Side B). By way of example, the first contact strip 21 contains four contacts c1, c2, c3 and c4 on the first surface and the second contact strip 23 contains four contacts c5, c6, c7 and c8 on the opposite (second) surface such that contacts c1 and c8 are complementary as are contacts c2 and c7 and so on.

This is shown clearer in FIG. 2c showing schematically a side view of the connector 20, from which it emerges that insertion of the male USB connector 20 into a female USB receptacle 25 in a first direction causes the contacts c1 to c4 to be properly aligned with corresponding contacts GND, D+, D− and $V_{BUS}$ in the receptacle 25, while reversing the male USB connector causes the complementary contacts c8 to c5 to be properly aligned with the contacts GND, D+, D− and $V_{BUS}$ respectively in the receptacle, thus permitting proper connection of the male USB connector 20 into the female USB receptacle 25 in either direction.

The USB connector 20 is thus a multi-contact connector supporting on opposite surfaces first and second sets of contacts 21 and 23 wherein corresponding contacts c1 to c4 in the first set are spatially aligned in anti-phase relationship with corresponding contacts c8 to c5 in the second set. Thus, for example, c1 and c8 are corresponding contacts on opposite surfaces of the connector but are spatially aligned in anti-phase relationship while contacts c1, c5 and c2, c6 are aligned directly. This allows the connector to be connected in two opposed orientations to a corresponding multi-contact data connector having only a single set of contacts that is compatible to either one of contact sets. The male USB connector 20 may be a double sided PCB. Alternatively, the male USB connector 20 may be manufactured using a plastic mold injection.

It to be noted that the term "USB connector" when applied to either a male or female connector refers to a USB compatible connector. Thus, specifically, the male USB connector 20 does not need to have the mechanical characteristics of a male USB plug as defined in www.usb.org. But it does need to be able to mate electrically with a standard USB socket.

FIG. 2d shows a modified USB receptacle 25 (constituting a female USB connector) according to the invention to which the complementary male USB connector 20 may be coupled in either direction. To the extent that the receptacle employs equivalent components to that used in the prior art receptacle described above with reference to FIG. 1, identical reference numerals will be used. A contact strip shown as 12 has depending therefrom the four primary electrical contacts $V_{BUS}$, D+, D− and GND for connecting thereto the positive voltage rail, positive and negative data lines and ground, respectively. A shaped slot 26 accommodates the male USB connector 20 so that the peripheral contacts c1 to c4 or c5 to c8 on an outer surface thereof engage the corresponding contacts on the connector strip 12 depending on the orientation in which the male USB connector 20 is inserted into the USB receptacle 25. The double sided male USB connector 20 may thus be inserted within the USB receptacle 25 in either direction, while ensuring that the contacts proximate the complementary contacts of the contact strip 12 are always properly aligned. The peripheral contacts on the reverse side of the USB male connector may then short circuit the resilient leaves 11 which are usually metallic and are coupled to GND via the rectangular frame to which they are connected. This, of course, must be avoided.

FIGS. 2d and 2e show schematic perspective views of a preferred embodiment showing two pairs of complementary contacts c1, c8 and c4, c5 of the male USB connector 20 which are connected to the $V_{BUS}$ and GND connections respectively of the USB receptacle 25. Each of the contacts c4 and c5 in the male USB connector 20 is connected to the anode of a respective diode 27 and 28. When contact c4 engages the $V_{BUS}$ contact of the USB receptacle 25 and is thus at positive potential, the diode 27 conducts but since the contact c5 on the opposite surface of the USB male connector engages the leaf spring 11 and is therefore connected to GND, the diode 28 is reverse biased and so opposes current flow. The opposite occurs when the male USB connector is inverted such that contact c4 is either at floating potential or is short-circuited to ground via the leaf springs 11. By such means, the possibility of a short circuit between $V_{BUS}$ and GND is avoided upon inverting the male USB connector. The $V_{BUS}$ contacts of the male USB connector 20 corresponding to the contacts c4 and c5 are routed via the diodes to a single $V_{BUS}$ contact. Likewise the GND contacts corresponding to the contacts c1 and c8 are routed to a single GND contact. It will be appreciated that the diodes can be used in such manner to prevent a short circuit with either a double sided USB connector or a single sided USB connector that is inserted such that its contacts face the opposite side of the receptacle USB contacts, thereby risking short circuit with the leaf springs 11.

FIG. 2e shows an alternative solution to the short circuit problem, wherein the $V_{BUS}$ and GND contacts of the USB connector 20 are connected to a relay unit 31 that transfers only forward current from the $V_{BUS}$ contacts and does not open the circuit if GND is in contact with one of the $V_{BUS}$ wires. Alternatively, the relay unit 31 may also be connected to each of the $V_{BUS}$ contacts by itself.

Figure 3:
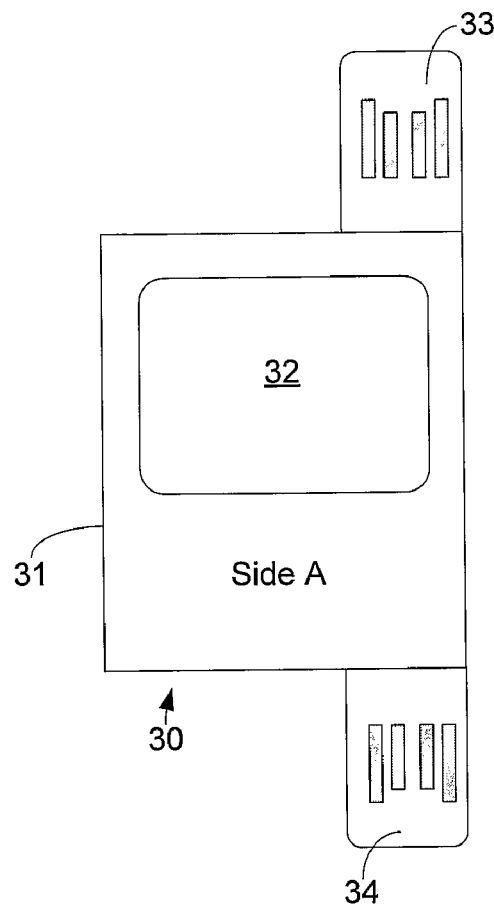
FIG. 3 is a plan view of a device having multiple USB connectors according to an embodiment of the invention.

FIG. 3 shows schematically an upper plan view of a device 30 comprising a planar substrate 31 supporting an electronic circuit 32 and having depending from opposite sides thereof respective male USB connectors 33 and 34. Either or both of the male USB connectors 33 and 34 may be a double sided connector with a contact arrangement corresponding to that of FIG. 2 or may be a conventional male USB connector having contacts disposed on a single surface only. The electronic circuit 32 can be located within the volume of the planar substrate 31 or within the volume of either of the connectors 33, 34 or may be divided between both. The planar substrate 31 may be of similar dimensions to a standard credit card thereby forming the basis for a family of card-like devices as will become apparent in the following description.

In case it is not possible to connect the USB connector 33 from one side, the device 30 may be either overturned or connected from the opposite side, or the device may be turned through 180° and connected using the USB connector 34. The device 30 is thus a multi-contact male connector having a planar substrate 31 from which there protrude two sets of contacts 33 and 34. The contacts of each set are spatially disposed relative to the planar substrate in a mutually asymmetrical relationship in that, for example, the $V_{BUS}$ contact of the contact set 33 must be on the left hand side of the contact set 33 as shown while the $V_{BUS}$ contact of the contact set 34 must be on the right hand side of the contact set 34, and so on. This allows connection to a corresponding female connector in two different orientations of the device.

The electronic circuit 32 may be:
  a disk on key device: a portable device with a USB connection and memory used to store and retrieve information, and to exchange information between computers.
  a USB token: a portable USB device used to authenticate a user locally or with a remote server, controlling access to computer networks, digital signature verification, storing sensitive information not stored in a computer system.
  an MP3 player: a device used to store and play sound files in MP3 format
  Means to distribute software.

The electronic circuit 32 may have means for digital rights management (DRM).

Figure 4A:
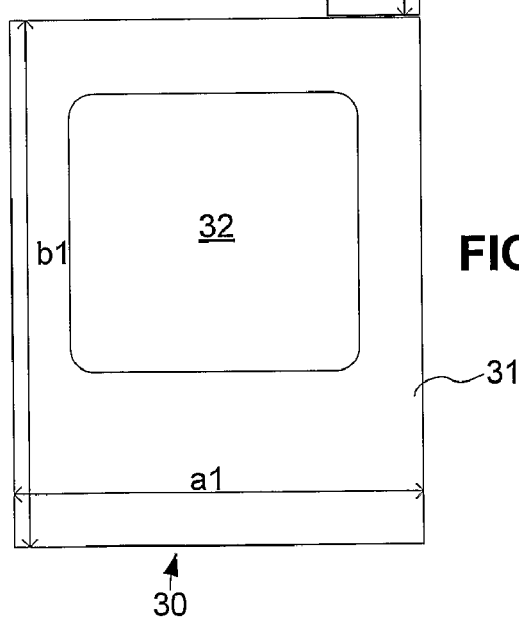
FIGS. 4a and 4b are plan and cross sectional views respectively of the device illustrated in FIG. 3 showing its dimensions.

FIG. 4a is an upper plan view of a card 31 according to a different embodiment bearing an electronic circuit 32 and having a single double-sided male USB connector 20, whose width is denoted by "a", and whose length is denoted by "b". Likewise, the width of the card 31 is denoted by "a1" and its width by "b1". If desired, the card 31 may be provided with an additional USB connector as shown in FIG. 3.

Figure 4B:
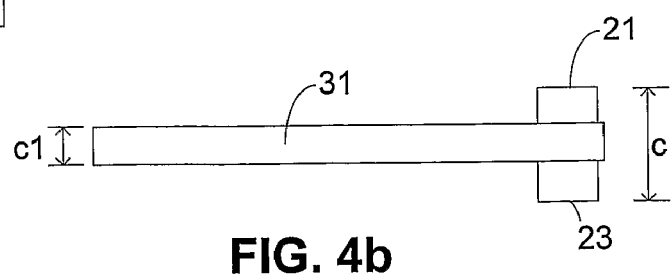

FIG. 4b is a cross sectional view of the card 31 showing the maximal thickness denoted by "c" of the contact strips 21 and 23 (using the notation described with reference to FIGS. 2a and 2b) and the maximal thickness of the card being denoted by "c1".

In a preferred embodiment, the device is constructed such that a1 is greater than 35 mm and b1 is greater than 40 mm and c1 is lower than 3 mm, in order to fit in a user's wallet. The width "a" of the connector is less than 13 mm in order to enable insertion into a conventional USB socket. The length "b1" of the device is greater than 3 mm in order to enable electrical connection between the respective contacts of the male USB connector 20 and of the USB socket.

Figure 5:
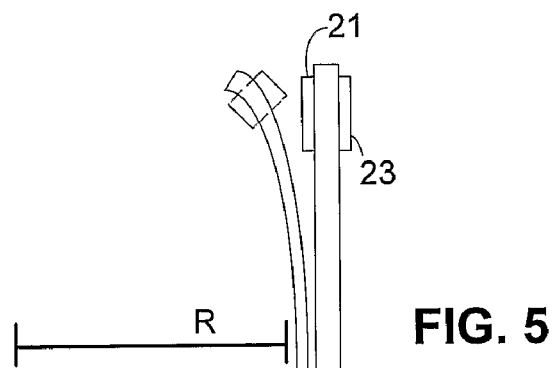
FIG. 5 shows schematically a flexible card shaped device according to the invention.

FIG. 5 illustrates a card 31 having a double sided USB male connector having contact strips 21 and 23 and which is flexible to a radius of curvature R<50 cm without losing electrical or mechanical functionality. In accordance with an embodiment of the invention, a is preferably 12.2 mm, b is preferably 16 mm, a1 is preferably 54 mm and b1 is preferably 69.7 mm.

Figure 6A:
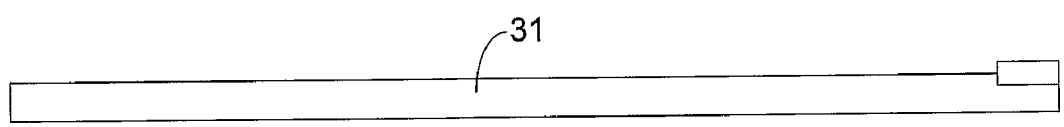
FIGS. 6a and 6b are cross sectional views showing how the flexibility of the device shown in FIG. 5 allows the effective thickness of the connector to be doubled.
Figure 6B:
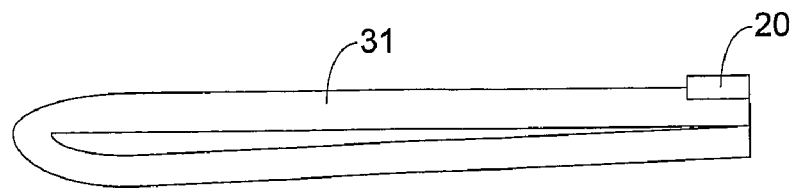

FIGS. 6a and 6b are cross sectional views showing how the flexibility of the card 31 shown in FIG. 5 may be exploited to compensate for less than the minimal thickness required for insertion of the male USB connector into a USB socket, it being noted that if the male USB connector presents too narrow a profile it will slip out of the receptacle since the leaf springs will not press against the peripheral surfaces of the male USB connector. To avoid this happening, the card 31 is made sufficiently flexible that it can be bent almost double without fracturing. By such means, its end opposite the connector 20 may be inserted into the receptacle together with the connector 20, thus presenting a combined profile having a total thickness (as shown in FIG. 6b) that is small enough to fit into the USB receptacle connector, while being sufficiently large to be engaged by the leaf springs and thereby maintained within the USB receptacle connector.

Figure 7A:
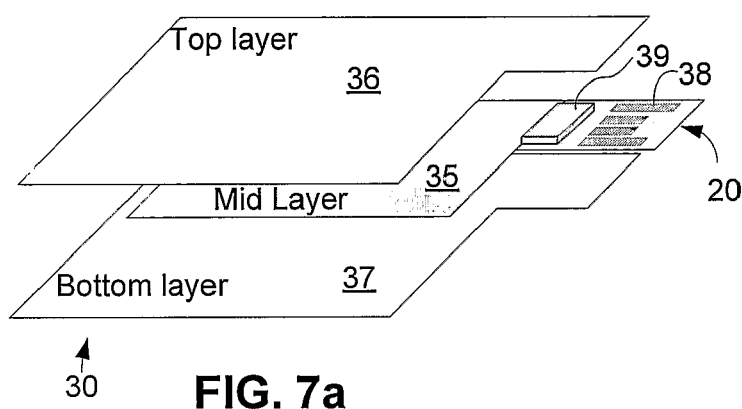
FIG. 7a is an exploded schematic view of a device according to the invention having a sandwiched construction.

FIG. 7a is an exploded schematic view of a device 30 having a sandwiched construction according to a preferred manufacturing process. Electronic circuitry (not shown) contains the electrical components and/or display component and/or power source components and is integrated with the USB connector 20. The electronic circuitry is contained in a mid-layer 35 that is placed between an insulating top layer 36 and an insulating bottom layer 37 of the device 30. The layers are joined are joined using a lamination process. The lamination process can be either hot lamination, which includes heating the surfaces in order to bond the layers, or cold lamination which can include epoxy and UV curing processes. The insulating layers 36 and 37 may be formed of PVC or any other suitable flexible, electrically insulating sheet material. The mid-layer 35 is "L"-shaped with a double sided male USB connector 20 formed on the projecting part of the "L" serving as a connector area 38. The top and bottom insulating layers 36 and 37, respectively, are similarly shaped so as to form a composite sandwich structure after assembly.

The laminated card offers a very narrow profile, typically in the order of 0.8 to 1.2 mm. There may be occasions when it is desired to integrate bulkier components having a higher profile without compromising the narrow profile of the card itself. This can be achieved by mounting thicker components 39 on the connector area, since as noted above with reference to FIG. 6b, the USB connector in any case must offer a wider profile than the thickness of a standard credit card in order to be retained within the USB receptacle.

It is to be noted that the laminated card as described above with reference to FIG. 7a includes a single USB connector having contacts on only a single surface thereof. However, the same principles may be equally well applied to planar substrates supporting a double sided USB connector or two or more USB connectors, either of which may be single or double sided.

Figure 7B:
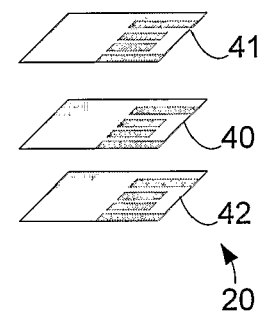
FIG. 7b is an exploded schematic view of a connector according to the invention having a sandwiched construction.

FIG. 7b is an exploded schematic view of a connector 20 according to the invention having a sandwiched construction. Connector 20 is made by sandwiching:
  a. mid PCB 40
  b. top PCB 41 having top external contacts
  c. bottom PCB 42 having bottom external contacts The PCBs 41 and 42 are electrically connected to the PCB 40 after the sandwiching process.

Figure 8:
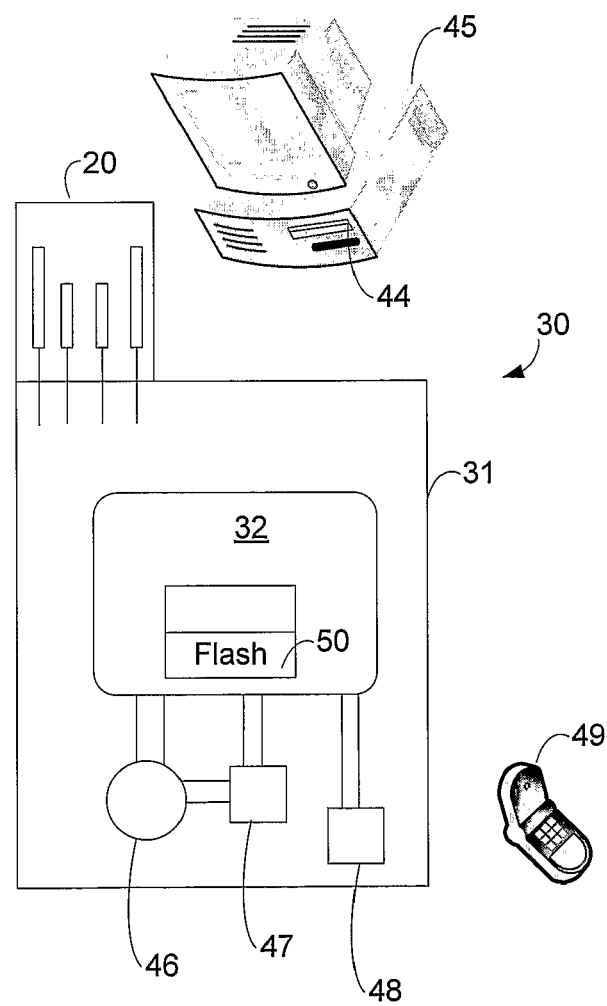
FIG. 8 is a plan view of a device incorporating a card and having an electronic circuit and a double sided male USB connector.

FIG. 8 is a plan view of a device incorporating the card 31 with the electronic circuit 32 and having a double sided male USB connector 20 as shown in FIG. 3. In use, the USB connector 20 may be plugged into the USB port (i.e. receptacle) 44 of a computer 45 (constituting a first electronic device) so as to deliver power via the contacts of the USB connector 20 to the electronic circuit 32. Additionally or alternatively, a photovoltaic cell and/or a solar panel both shown schematically as 46 may be provided so as to charge a rechargeable power source 47 within the card 31 and which may be, for example, a rechargeable battery or a capacitor. The card 31 may be provided with a recess into which a battery is removably fixed. The card 31 may be provided with a second interface 48 allowing the card 31 to be connected to a second electronic device 49 such as a mobile telephone or a PDA. The second interface 48 may have contacts for feeding supply power to the second electronic device 49. The electronic circuit 32 may include memory such as flash components 50 for flash drive applications. Preferably, the flash components comprise both rewritable and non-erasable areas.

The card 31 can store an encryption key used for authentication. For example, the computer 45 may be programmed to respond to insertion of the card into the USB receptacle 44, to send challenge data to the device to which the device will respond with a result than depends on the stored encryption key. The computer 45 will then validate the response and either allow or deny access to its hard disk.

Many portable appliances having an internal battery, such as those used for wireless communication, often consume significant electrical power, such that their batteries become discharged quickly, and lose their usability. Hence, if the power source 47 within the card 31 is rechargeable, it can easily be maintained topped up in a convenient and cost effective manner.

Figure 9:
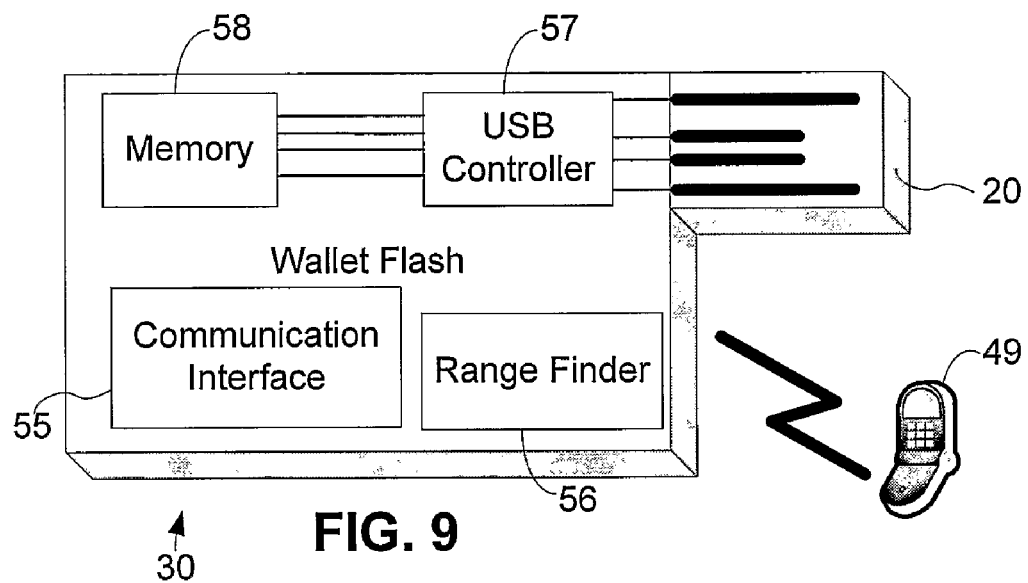
FIG. 9 is a schematic view of a device having a communication interface for coupling to other electronic devices.

FIG. 9 is a schematic view of an embodiment of the present invention that shows the communication between a device 30 corresponding to that shown in FIG. 8 and another electronic device 49 such as a cellular phone, lap-top, PDA, wireless mouse, wireless keyboard or similar device through a communication interface denoted 55. The communication interface 55 may be a wired communication such as USB communication, an RF communication such as Bluetooth, 802.1, 802.11X, USB wireless, wi-fi, wi-max, GSM, UMTS, GPRS, EDGE, CDPD, ISO 14443, ISO 15693, or infra red communication such as IRDA. Furthermore, the communication interface 55 can be coupled to a rangefinder 56 such as a GPS receiver or means for cellular station triangulation so as to estimate the location of the device 31. The device 30 may include USB controller 57 and flash memory 58. This way it can serve as both RF adaptor and a flash drive. The device 30 may use such communication to record audio or video, in real time or off-line from the communication interface. For example, it can record a telephone conversation conveyed via the user's cellular phone 49.

Figure 10:
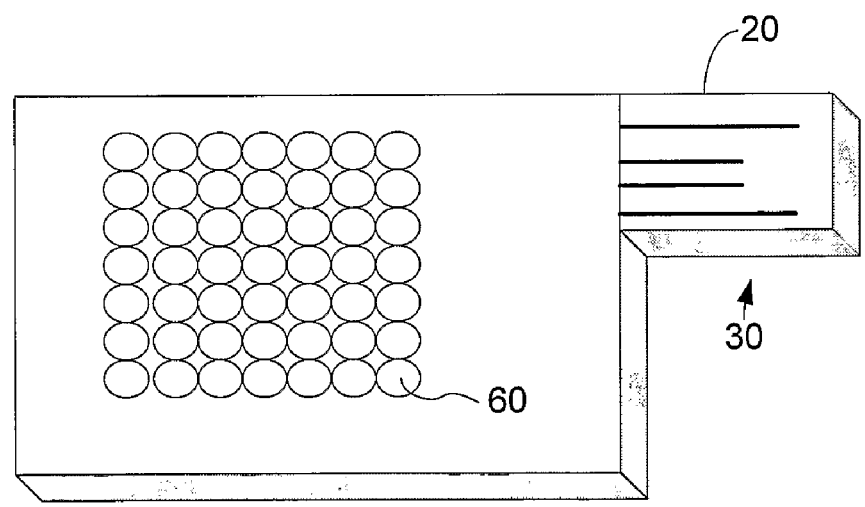
FIG. 10 is a plan view of a device with integral display.

FIG. 10 is a top plan view of an embodiment of the current invention in which the device 31 has a display 60 for displaying visual information. The display 60 may be LED, LED's matrix, LCD, Electroluminescence (EL), or OLED. In the case that the device 31 is formed of sandwiched construction as described above with reference to FIG. 7a, the top layer 36, which covers the display 60, needs to be transparent to enable the visual information to be visible. The visual information could be for example photos or videos of family members. This way the device can serve as a mini photo album on a card. Furthermore, the display can be operated as a form of flashlight whose color can be changed.

Alternatively, the visual information may be messages received either through wireless communication or through the USB data communication once the user plugs the card into a computer connected to a remote server.

Figure 11:
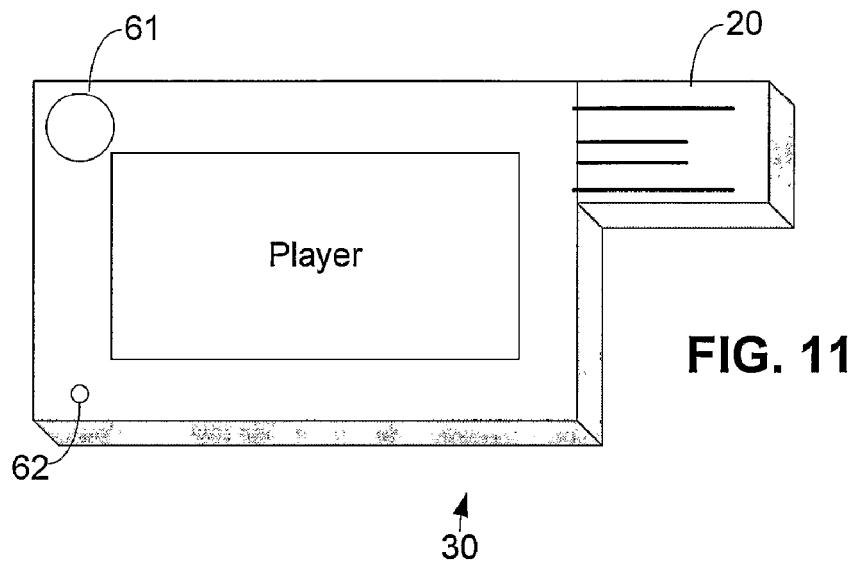
FIG. 11 is a plan view of a device having means for playing or replaying audio information.

FIG. 11 is a top plan view of the device 31 according to an alternative embodiment of the invention having means for playing or replaying audio information directly through a loudspeaker 61, which may be a piezoelectric speaker, or indirectly through an audio connector 62 that can be connected to an earphone or an audio system capable of playing sound such as a stereo system.

This way the device 31 could serve as:
An MP3 player: A device used to store and play music files in MP3 or any other sound format such as MP3 Pro, MPEG WMA, AAC, AAC+, MPEG 4, ATRAC3
A radio: An FM or an AM radio
A voice recorder: A device that can record and replay sound like dictations, conversations or similar.
A cellular or cordless phone.

Figure 12:
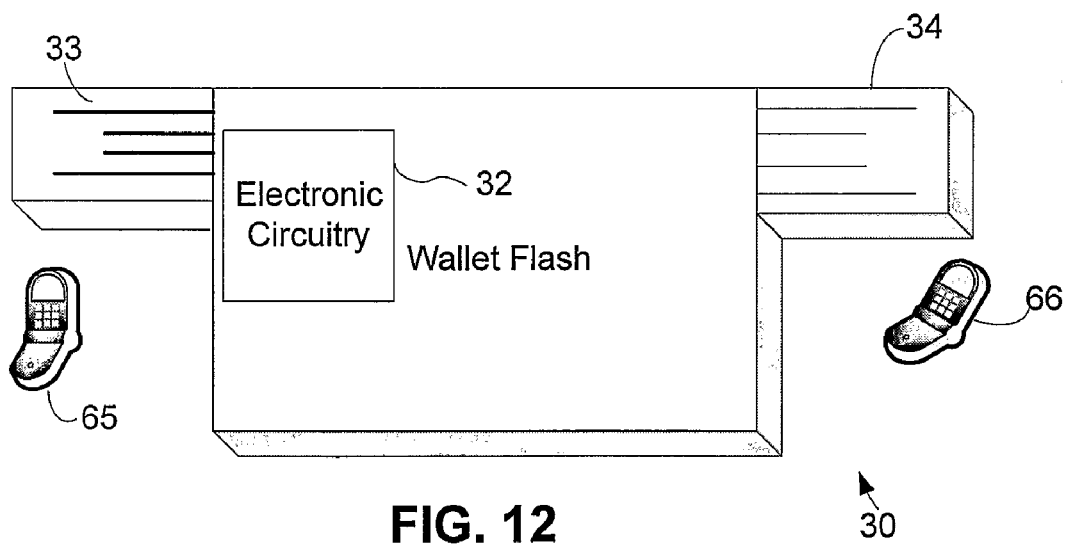
FIG. 12 is a schematic view of a device having multiple male USB connectors.

FIG. 12 is a schematic view of an embodiment of the device 31 having multiple male USB connectors illustrating the connection between a first external device 65 through a first male USB connector 33 and a second external device 66 through a second male USB connector 34. Communication to both external devices can be done either using the same communication protocol, such as USB protocol, or using different protocols with the device 31 converting the data from one protocol to the other.

Figure 13:
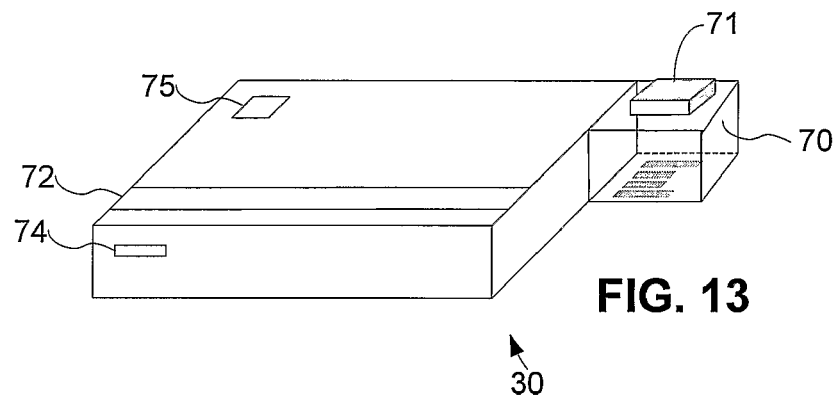
FIG. 13 is a side perspective view of a device having a double sided male USB connector.

FIG. 13 is a side perspective view of a device 30 according to an alternative embodiment of the present invention, having an embossed male USB connector 70 as described above. It is known that embossing a surface of the card results in its effective height being increased, this being exploited by ATM machines, for example, which allow slightly thicker cards to be inserted but do not permit the card to be inserted with the embossed surface facing downwards. An alternative approach to increasing the thickness of the USB connector without compromising the narrow profile of the card is to emboss the area of the USB connector 70 thus giving rise to embossed portions 71. The embossed portions 108 can be formed using standard means for card embossing. The card 31 may also be embossed, preferably in the standard embossing locations as defined by ISO 7811-1, thus offering a maximum profile in the order of 1.2 mm. Furthermore, the card 31 may also carry a magnetic stripe 72 that can be read using standard magnetic stripe readers. Optionally, the card 31 may carry a SIM reader with contacts 74, or just a Smart Card module 75 within its volume. Such a smart card module 75 may optionally be electrically connected directly or indirectly to the USB contacts.

Figure 14:
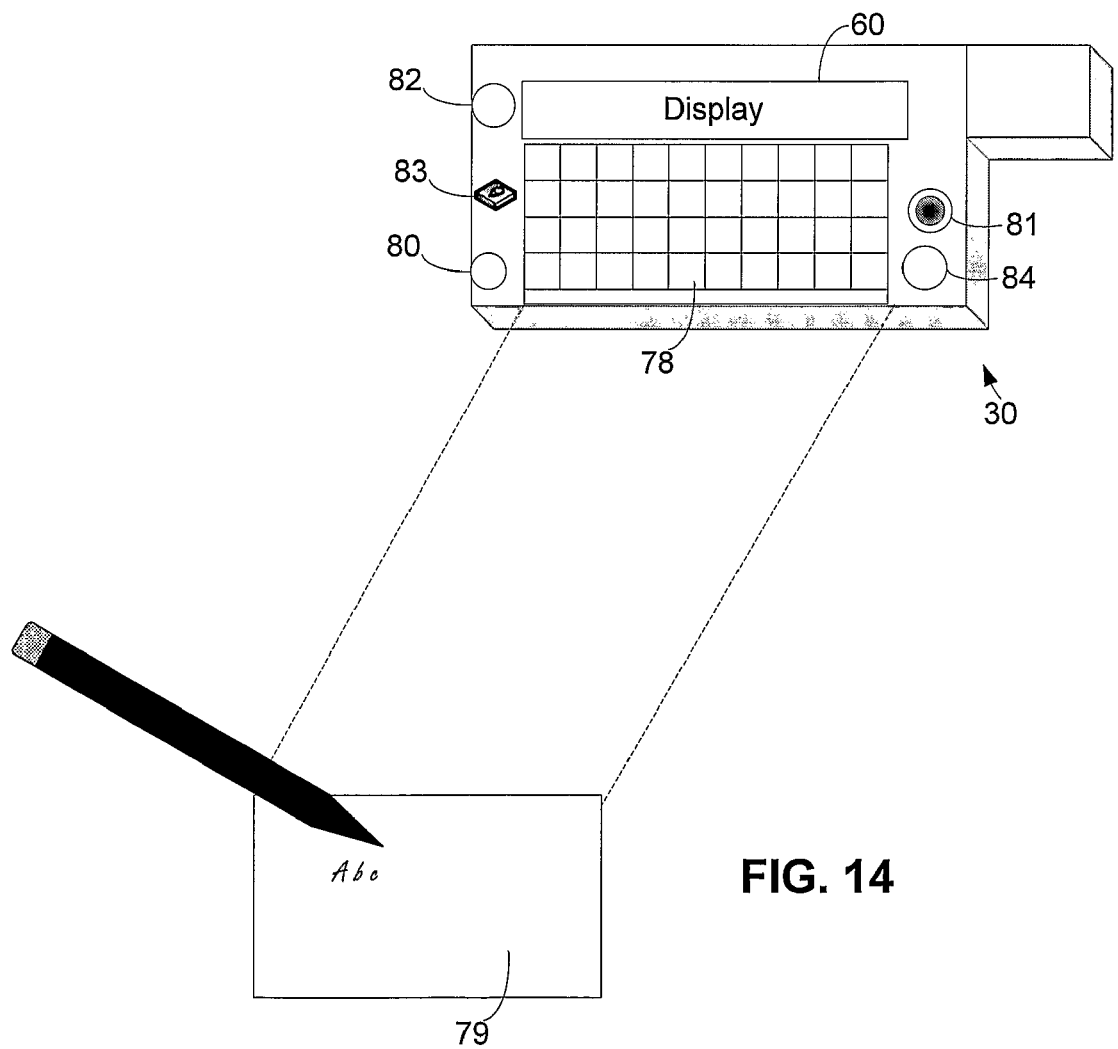
FIG. 14 is a side perspective of a device having a user interface for inputting ASCII information.

FIG. 14 is a side view of a device 31 according to another embodiment having a user interface for inputting ASCII information. The user interface may include a full or reduced QWERTY keypad 78. An ASCII code pressed can be displayed using the aforementioned display 60 (shown in FIG. 10). Optionally, the device 31 can be provided with a touch pad 79 for receiving hand written input. Optionally, the device 31 can be provided with a transducer for inputting voice or other audio information such as microphone 80 for voice commands. The device 31 can be provided with a camera 81 to capture visual or infrared still or movie images and/or one or more sensors 82 such as accelerometers or position detectors responsive to spatial movement of the device. Furthermore, the device 31 may be provided with a biometric reader 83, for authenticating the user of the device, and/or providing a digital signature thereby preventing unauthorized use of the device. In this case, the device 31 may serve as a biometric authentication token. Furthermore, the device 31 may be provided with a sensor 84 such as a pressure sensor that may be used to weigh objects such as food or even humans. Alternatively the sensor 84 may be a temperature sensor that can be used to log the temperature of a shipment to which the device 30 is attached so as to verify that its temperature remains within a specified temperature range. Alternatively the sensor 84 can be a set of two electrodes for measuring Galvanic Skin Response.

Figure 15A:
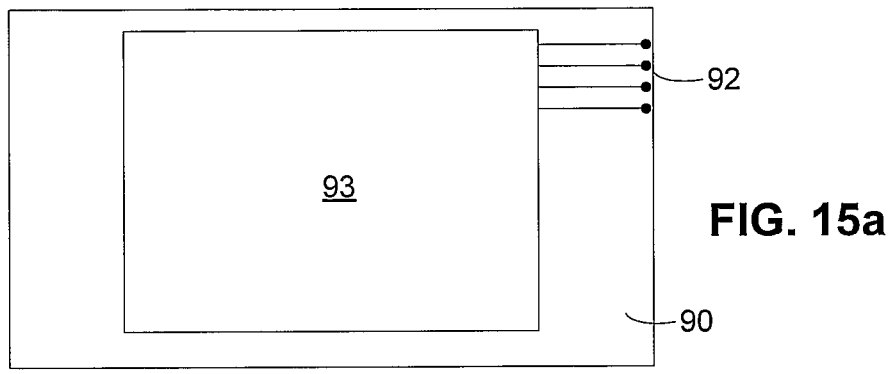
FIGS. 15a and 15b are plan and cross-sectional views respectively of a thin USB receptacle.
Figure 15B:
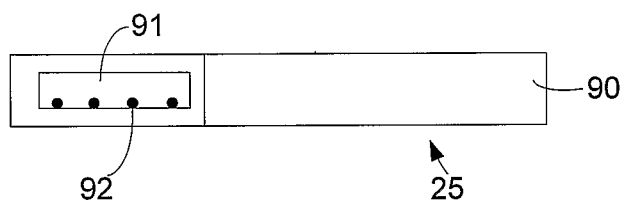

FIG. 15a is a top plan view of a thin USB receptacle 25 according to an embodiment of the invention and shown in cross-sectional side elevation in FIG. 15b. The USB receptacle 25 comprises a thin casing 90 having an opening 91 with a plurality of contacts 92 electrically connected to electronic circuitry 93. The opening 91 is designed so that a male USB connector 20 can be plugged into it. The casing 90 can be a card like element with dimensions similar to those of a credit card or a thin electronic device. The contacts can be 4 USB contacts, 5 Mini USB contacts or similar.

By such means the device 31 can be connected to the receptacle 25 without losing its compatibility to standard USB receptacles.

As shown in FIG. 15b, the contacts are disposed along a lower inside surface of the opening 91 so as to be engaged by corresponding contacts on a lower surface of a male USB connector when inserted into the opening 91. Optionally, another set of similar connectors can be disposed on the upper inside surface of the connectors in the opening 91. This way, a single sided male USB connector of a device 30 (not shown in this figure) can be inserted either way into the opening 91 of the thin USB receptacle 25 while making electrical contact with one set of the upper or lower contacts therein.

This arrangement requires that either the receptacle 25 or the device 30 have a power source. Such an arrangement can be used to exchange information such as contact details, pictures or any other electronic files. For instance, instead of transferring information from one disk on key device to another using a mediating computer, information can be exchanged directly between the two devices by connecting them to each other.

The receptacle 25 or the device 31 may be provided with a user interface to facilitate the transfer of information, such as a display or buttons.

Figure 16:
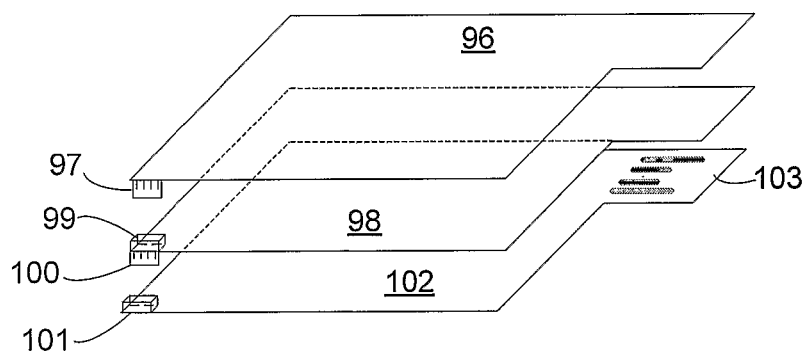
FIG. 16 is an exploded view showing schematically a stack of electronic modular components employing a plurality of card modules according to the invention.

FIG. 16 is an exploded view showing schematically a modular computer 95 formed of a stack of electronic modular components employing a plurality of card modules according to the invention. An upper card module 96 has a male connector 97, which connects to a central card module 98, which has both a receptacle 99 and a male connector 100 that connects to a receptacle 101 of a lower card module 102.

The upper card module 96 can be provided with a display and keypad, for example, serving as an accessible user interface, while the central card module 98 can be provided with flash memory or a hard disk and the lower card module 102 can be provided with a CPU and a male USB connector 103. Obviously, any suitable distribution of components is equally feasible. The USB connector 103 may be a double sided USB connector corresponding to the USB connector 20 shown in FIGS. 2a and 2b; or it can be a single sided USB connector corresponding to the USB connector 34 or 34 shown in FIG. 3.

The connectors are preferably embedded within their respective modules, although they could be coupled thereto by ribbon cable for example, allowing external coupling and de-coupling of the modules. The connectors connect the modules both electrically and mechanically and can also convey voltage and/or data between adjacent modules. By such means, one or more connectors can be used to feed voltage from an external supply for recharging a rechargeable power supply within one or more modules.

If desired, the modular computer 95 can be rendered sufficiently compact that it can be carried pre-assembled or, alternatively, each module can be carried separately, for example, in one's wallet or pocket for subsequent assembly prior to actual use. Such a modular construction allows each of the modules to be replaced or upgraded separately and allows the user to carry selected modules only for specific occasions, like carrying a cellular modem when one is on vacation. By such means, different modules may be assembled to build different products like Lego® so that the user takes only those modules that he needs to construct a specific end-product. Lego is a registered trademark of the Danish corporation LEGO A/S. For example, a wifi module can be disposed with if the only required functionality of the device is the ability to computer and display numerical calculations.

Figure 17:
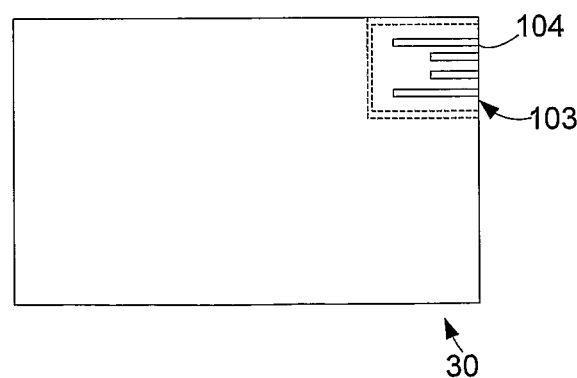
FIGS. 17 to 20 show various views of card shaped devices having a USB receptacle according to different embodiments.

FIG. 17 is a top plan view of a card shaped device 31 having a male USB connector 103 provided with USB contacts 104. The USB connector 103 can have 4 standard USB contacts or 5 mini USB contacts, so as to enable electrical coupling to a standard USB receptacle or to a standard min USB receptacle. This way standard USB receptacles, such as those connected to a USB card can be used to communicate with or feed to power other devices. The device 31 can be a card like element with dimensions similar to those of a credit card or a thin electronic device.

Figure 18:
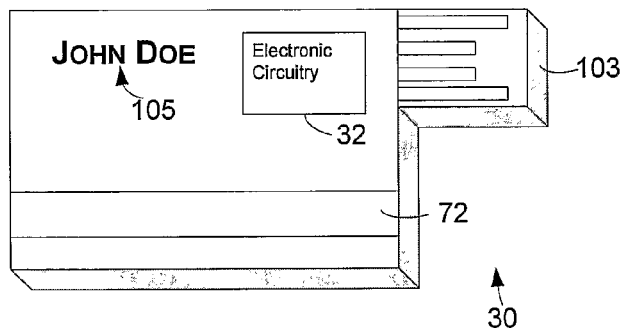

FIG. 18 is a top plan view of a card-shaped device 31 having an electronic circuit 32 according to another embodiment of the present invention, wherein embossing 105 is done on the same surface of the card 31 as the contacts of a male USB connector 103. The embossing increases the thickness of the device 31 but still permits it to be inserted into an ATM card reader, which as noted above allows slightly thicker cards to be inserted but does not permit the card to be inserted with the embossed surface facing downwards. At the same time, the embossing 105 can overlap the USB connector 103 so that its profile is thereby rendered sufficient high to be retained within a USB receptacle by the resilient leaves 11 (shown in FIG. 2c). The card may also be provided with a magnetic stripe 72, thus giving the card dual functionality: as a regular ATM card and as a smart card having a USB connector.

Figure 19:
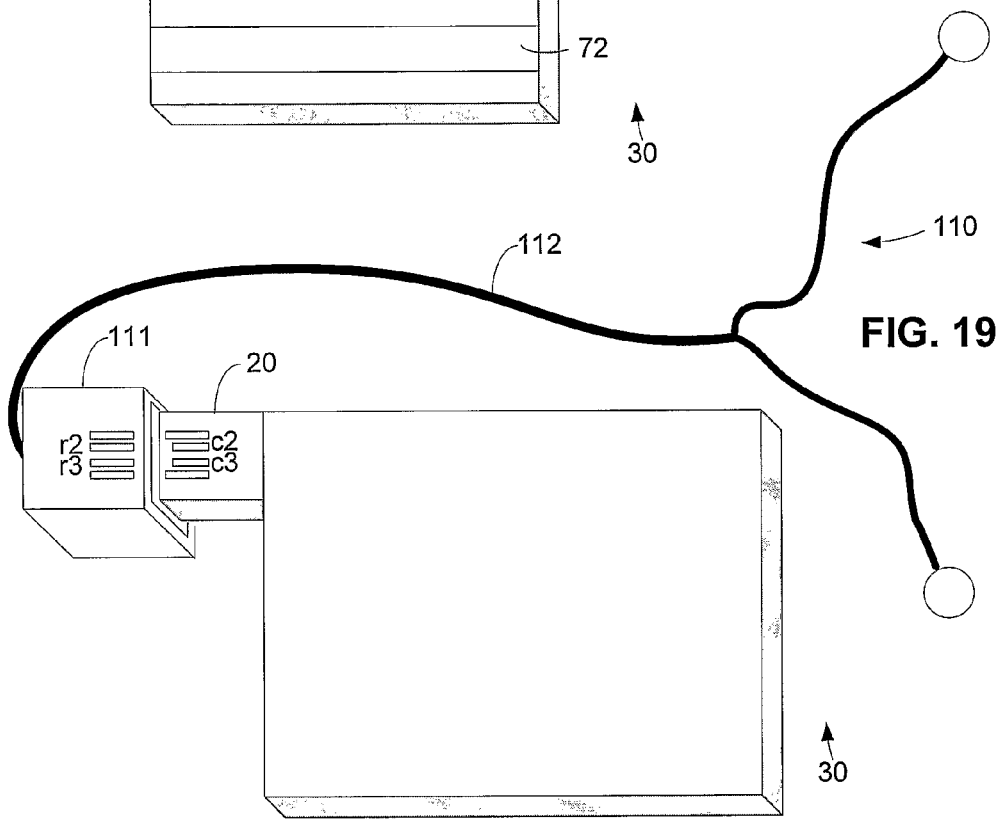

FIG. 19 is a top plan view of a card-shaped device 30 according to another embodiment of the present invention, having planar substrate 31 from which there projects a male USB connector 20 that may be coupled to an earphone 110 via a USB receptacle 111 (constituting a female USB connector) that is connected to an electrical cord 112 of the earphone 110. An electrical sound signal is conveyed through contacts c2 and c3 of the male USB connector 20 in the device 30 to receiving contacts r2 and r3 in the USB receptacle 111. The electrical signal is then converted into an acoustic signal in the standard way. The earphone 110 with the USB receptacle 111 can connect to any other device having a USB male connector and having means to send an electrical sound signal through its USB contacts. For example, portable audio devices are becoming very popular and typically comprise a memory stick into which audio files (such as MP3-compatible files) can be downloaded from a computer coupled to a male USB connector of the device and which have a jack socket for coupling to an earphone. The device 30 shown in FIG. 19 can duplicate this functionality without the need for a regular jack socket since the earphone 110 has a female USB connector than can be coupled directly to the male USB connector 20 of the device. It will, of course, be appreciated that while the USB receptacle is shown in the device 30, it is also feasible for the device 30 to have a USB receptacle and for the complementary male USB connector to be coupled to the earphone.

Figure 20:
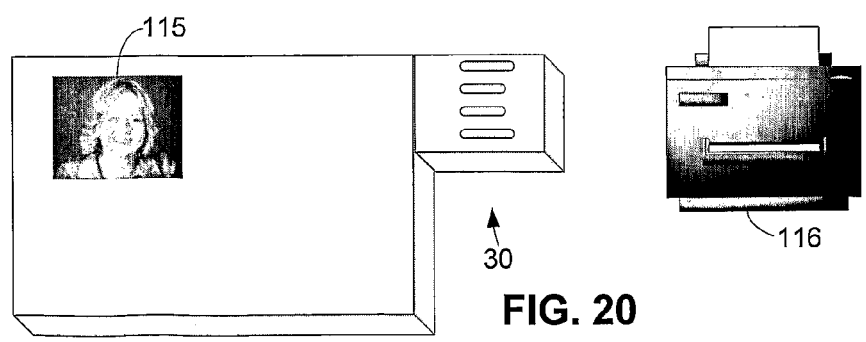

FIG. 20 is a top plan view showing an identity card 31 according to an embodiment of the present invention, wherein a photograph 115 of a card owner or any other representative image or graphics is printed on an outer surface of the card 31. For example, the card can be an MP3 player with the card owner's photograph thereon; or the card owner can elect to display a picture of his or her favorite singer. The card can be made thin enough to be printed post production using a standard card printer 116.

Figure 21:
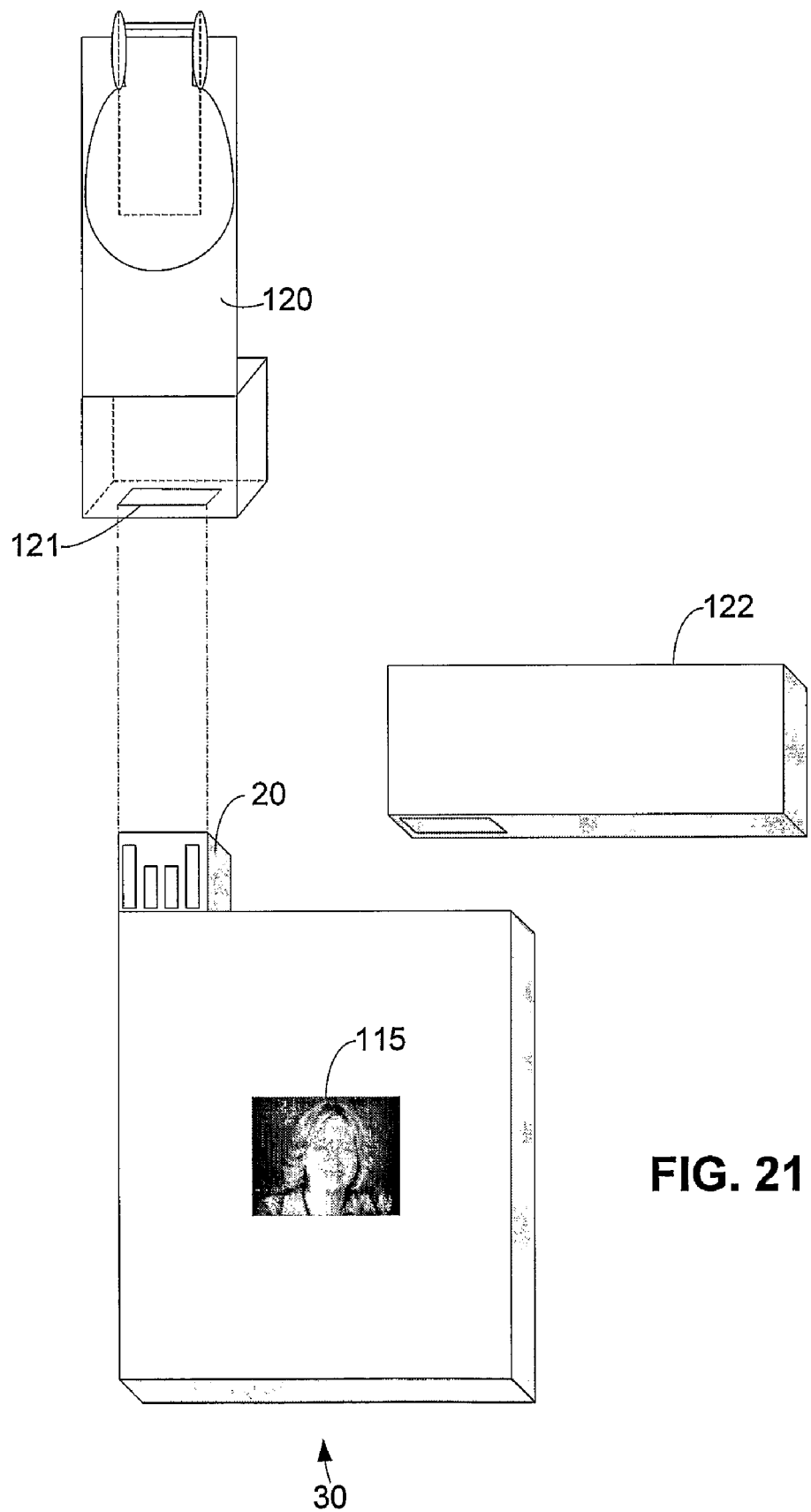
FIG. 21 is a plan view of a tag holder having a USB receptacle.

FIG. 21 is a plan view of a device 30 according to another embodiment of the present invention, in the form of a badge holder 120 having a receptacle 121 adapted for tightly accommodating the USB connector 20 of a user card 31 bearing an image 115 of the owner. By such means, the badge holder can retain the card 31 for an extended period of time even when worn around the owner's neck, owing to the friction between the USB contacts of the card 31 and the inside surface of the receptacle 121. Such a card 31 can be used as an employee tag that may be releasably coupled to the tag holder 120, which may be attached to one's clothing or worn on one's person. Alternatively, the card 31 can be releasably coupled to a holder or receptacle 122 such that the combined width and height of both once coupled are similar to those of a standard credit card.

Figure 22:
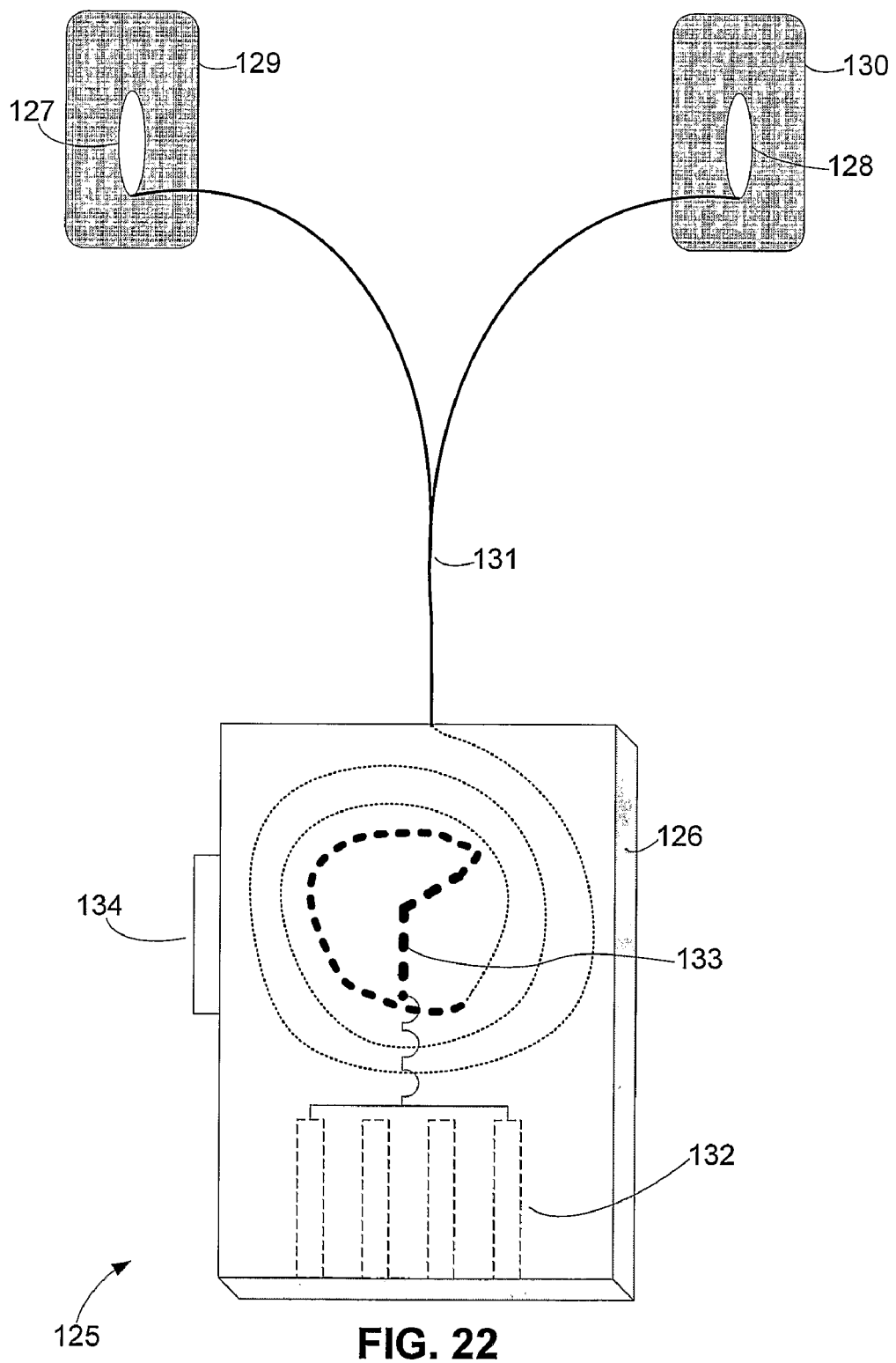
FIG. 22 is a plan view of an ultra thin earphone.

FIG. 22 is a plan view of a USB earphone 125 according to another embodiment of the invention. The USB earphone 125 has a hollow casing 126 and a pair of portable ultra thin earphones comprising respective buzzers 127, 128 each protected by respective sponges 129, 130. The buzzers are commonly coupled to a flexible electrical cord 131 that is retractable into the hollow casing 126 of the USB earphone 125. The USB earphone 125 also contains a USB receptacle 132 that is electrically connected to an end of the cord 131 and can connect to a standard or thin male USB connector 20. In use, the buzzers 127, 128 may be withdrawn from the casing against a biasing force provided by a spring 133 and the USB receptacle 132 can be coupled to a USB connector of an external device. After use, a release button 134 may be actuated so as to retract the cord 131 together with the buzzers under action of the spring 133.

The sponges 129, 130 are collapsible to a very small thickness thus allowing the buzzers and associated components to fit into the casing, the whole device being dimensioned for carrying in one's wallet. It will be appreciated that while the USB receptacle is shown in the device, it is also feasible for the device to have a male USB connector for coupling to the USB receptacle of an external device.

Figure 23:
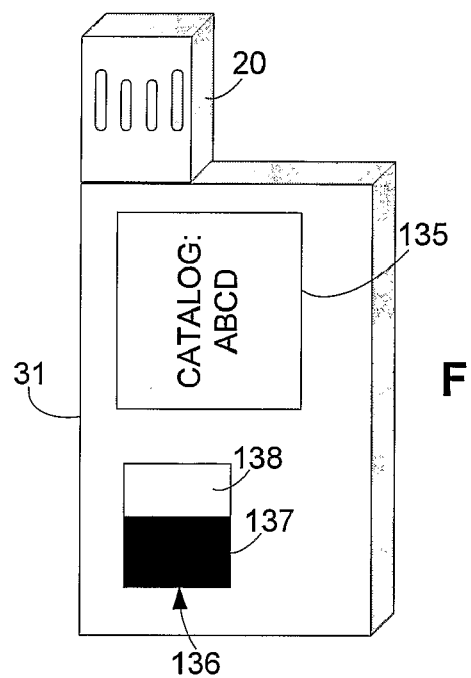
FIG. 23 is a plan view of a device having a write protected area in its memory.

FIG. 23 is a plan view of an embodiment of a device 30 according to another embodiment of the present invention, having a USB connector 20 projecting from a planar substrate 31 which contains a printed area 135 and a memory 136. The memory 136 comprises a first part 137 that relates to content data and is write protected by software or by hardware and cannot be erased by the user. A second part 138 of the memory 136 is a free space and is rewritable and erasable. Content data can be catalog data, travel data or any other similar data. The data can include formats such as HTML, PDF, Microsoft® Word, TIF or any other textual or graphical format, sound or video data or any mixture thereof. Microsoft is a registered trademark of Microsoft Corporation, Redmond, USA.

The device 30 can be used as an advertisement tool for companies which wish to distribute a catalog of their products or services. Such a company may want the users to keep the device. Since the device is reusable, the users may use it to store files in its memory. The printed area may display company information serving to keep its brand constantly in the mind of the users.

Figure 24:
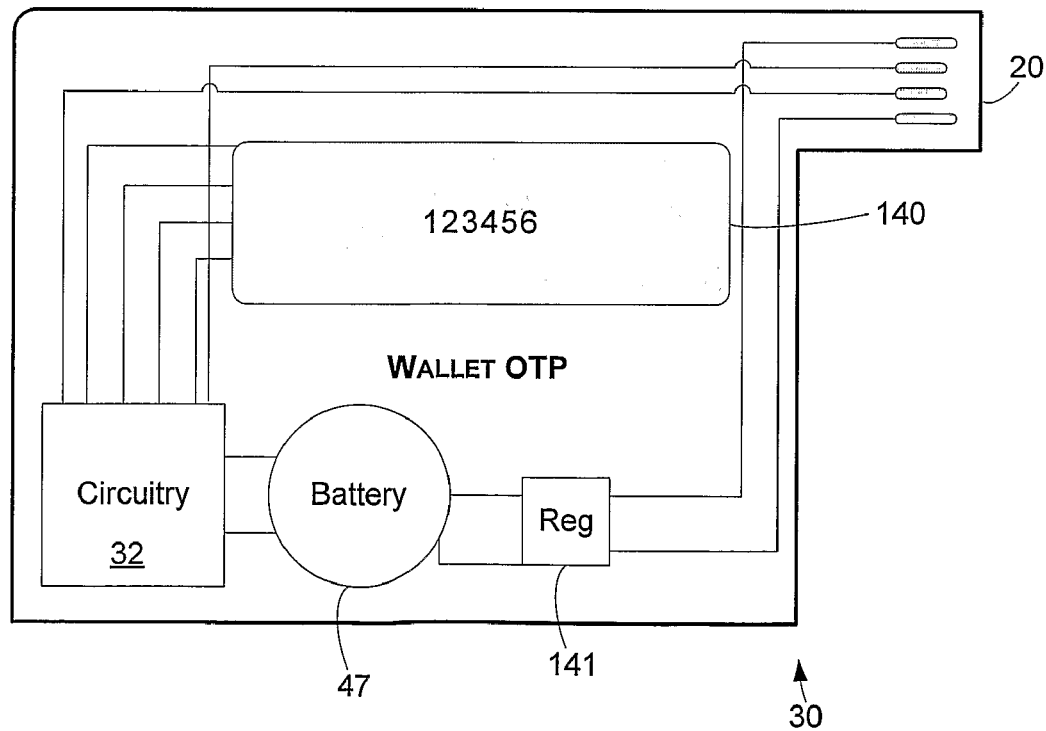
FIG. 24 is a plan view of a rechargeable and synchronizeable one time password device.

FIG. 24 is a plan view of a card-shaped device 30 according to another embodiment of the present invention, having a rechargeable battery 47 and a synchronizeable password generator constituted by circuitry 32 for generating a one-time password device that may be displayed by a display device 140 that is acceptable by a remote authentication server (not shown).

The device 30 includes a double-sided male USB connector 20 that can be used to do one or more of the following:
  a) Recharge the battery 47 via a regulator 141.
  b) Synchronize the password generator with a remote server or a PC through the USB data contacts.
  c) Initialize the device.
  d) Change the device's encryption key or keys The device 30 can be used as both a USB authentication token, rechargeable itself while connected and used as a password generator a user can key into another device such as a PC.

Figure 25A:
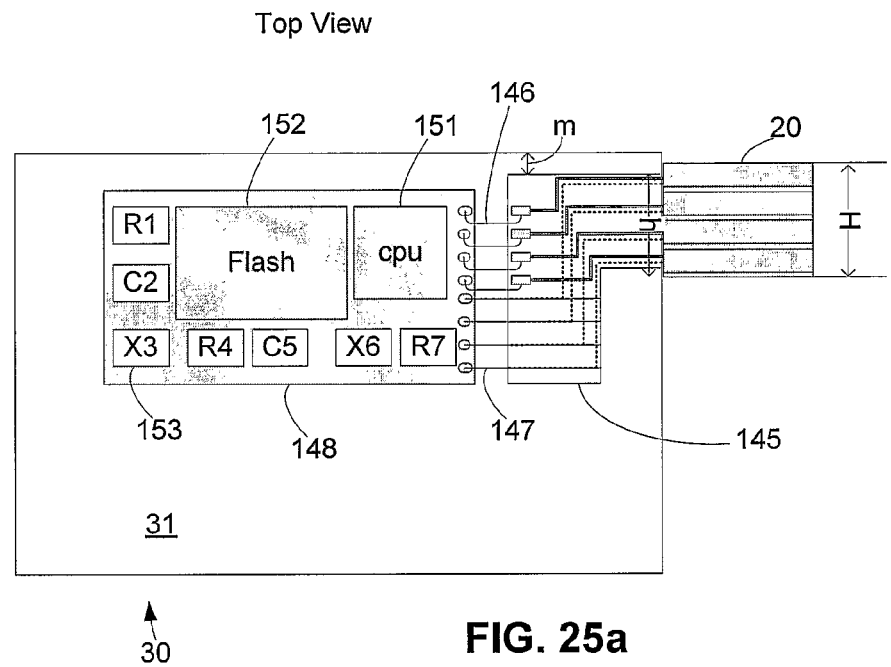
FIGS. 25a and 25b are plan and cross-sectional views respectively of a device having a double-sided male USB connector.
Figure 25B:
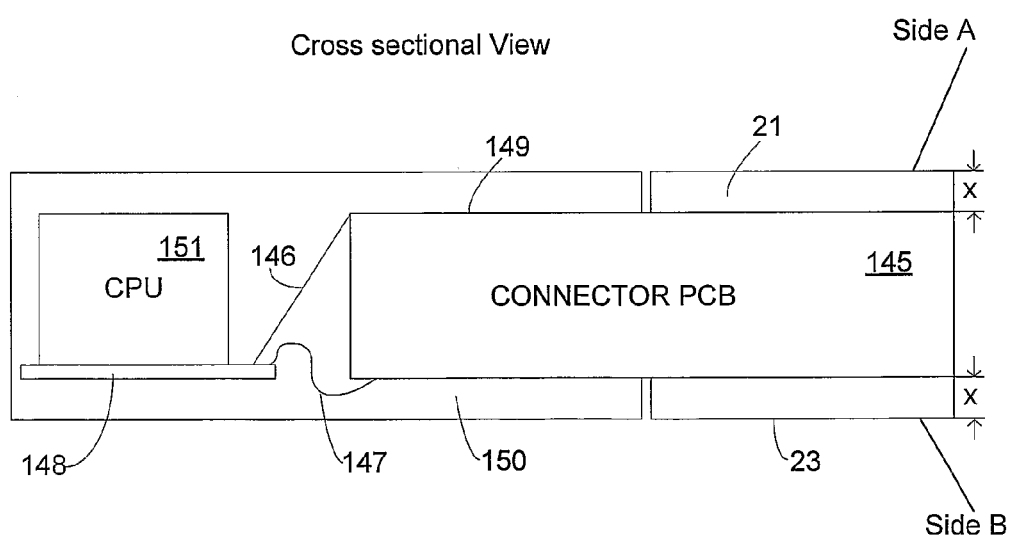

FIGS. 25a and 25b show, respectively, an upper plan view and a cross sectional view of a device 30 according to a different embodiment having a double-sided male USB connector 20 projecting from a planar substrate 31. The male USB connector 20 comprises a connector PCB 145 having a first contact strip 21 and a second contact strip 23 on opposite surfaces A and B (as described above with reference to FIGS. 2a and 2b of the drawings). The connector PCB 145 has one thicker portion that is outside of the card area having a thickness shown schematically in the figure as H, and a thinner portion part inside the card area having a thickness shown schematically in the figure as h, in order to allow for a thicker plastic margin inside the card body shown schematically in the figure as m than would be achieved if h and H were equal. It should be noted that the dimensions H, h and m are shown schematically in the plane of the paper but in reality they represent dimensions normal to the plane of the paper. Thus, the dimension h is such that when the thinner portion inside the card area is covered on both sides with lamination, the combined thickness is in the region of H so that the protruding portion is substantially flush with the laminated card. As better shown in FIG. 25b, part of the connector PCB 145 is fixed within the area of the substrate 31 so as to reduce the risk of dislocation of the card due to mechanical forces caused on connecting and disconnecting to the USB receptacle. The contact strips 21 and 23 are electrically connected via respective wires 146 and 147 to a main PCB 148. The contact strips 21 and 23 may be thin PCBs joined to the connector PCB 145. The thickness x of the contact strips 21 and 23 is similar to the thickness of respective insulating layers 149 and 150 laminated upon upper and lower surfaces of the connector PCB 145 but of course not covering the projecting contact strips 21 and 23. By such means, the external i.e. protruding part of the connector is significantly thicker than the thickness of the connector PCB 145 while nevertheless being substantially flush with the outer surfaces of the laminated layers 149 and 150.

Another option is to solder the connector PCB 145 to the main PCB 148 directly either when one PCB is joined on top of the other or inside the other thereby obviating the need for the connection wires 146 and 147. Yet another option is to join PCB 145 to PCB 148 using a flexible or rigid PCB patch. Yet another option is to manufacture PCB 145 to PCB 148 as one combined flexible-rigid PCB, in which case the connector side of PCB 145 can be the rigid part while PCB 148 is flexible. Alternatively, PCB 145 can also be flexible or semi-flexible. The PCB 145 can contain components that are placed within its volume (buried) such as ESD protection units and diodes. The main PCB 148 supports a CPU 151, an optional Flash memory 152 and optionally further electronic components 153 that are soldered to the PCB 148. All such components plus the internal part of the PCB 145 are covered by the insulating layers 149 and 150 as a result of the lamination process.

Figure 26:
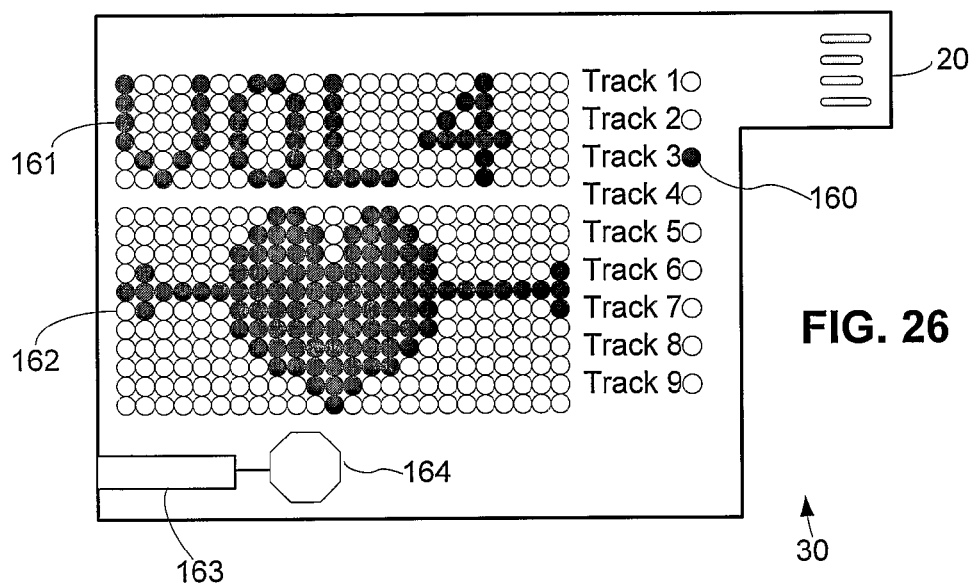
FIG. 26 is a plan view of a device having several alternative displays for displaying visual information.

FIG. 26 is a top plan view of a device 30 according to another embodiment of the invention having alternative displays for displaying visual information. A first display is an LED display 160 that signals the track playing on an MP3 device. Another type of possible display is an alphanumeric LED display 161 that can display track names or the lyrics of the playing track, preferably in sync with the playing track. The display can be either in static or scrolling mode. Yet another display type is a graphical display 162 which can display any alphanumeric or graphical information. The display area can span over a larger part of the card whereby a relatively large display area is created.

Optionally, the device can carry a laser pointer 163 that is turned on or off by an embedded dome switch 164.

Figure 27:
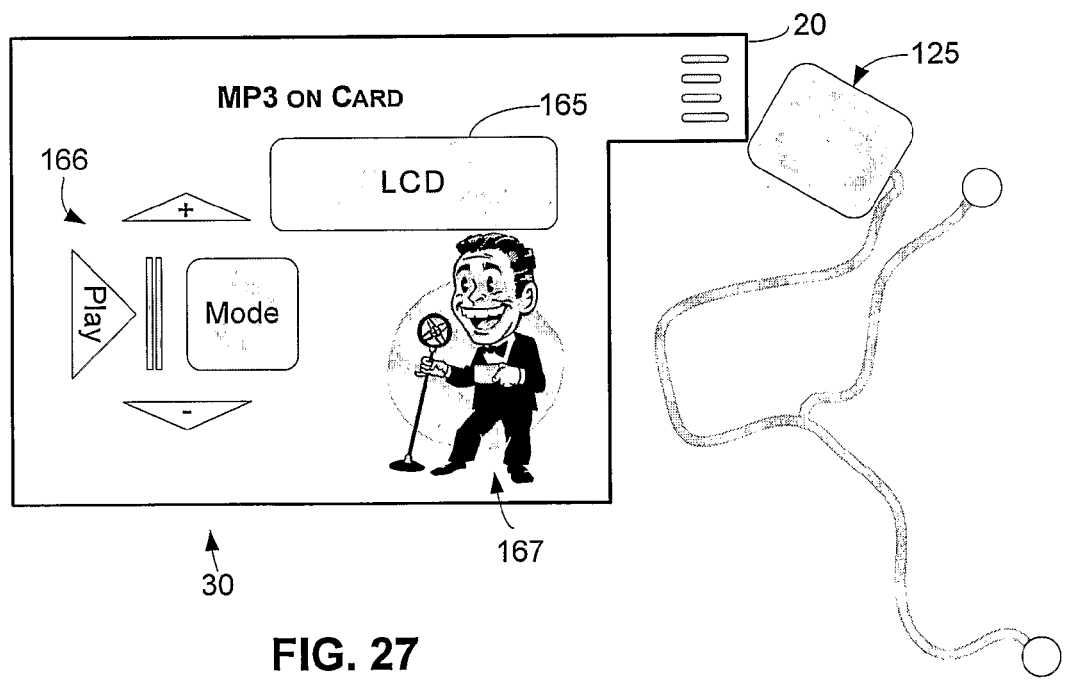
FIG. 27 is a top plan view of a portable audio player device.

FIG. 27 shows pictorially a top plan view of a device 30 according to another embodiment of the invention in the form of a portable audio player, such as MP3 player, in a credit card format. The device 30 has a double sided male USB connector 20 having three uses:
1. Communicating with another device such as a PC for downloading music files;
2. Connection to a recharging the unit; and
3. Audio connection to a USB earphone 125 as described above with reference to FIG. 22 of the drawings.

The device 30 includes an optional LCD or LED display 165 and embedded control buttons 166 such as play/pause, mode, volume up (+), volume down (−). The device can carry alternative graphics 167 that can be selected in a retail store or downloaded via the Internet, such as:
1. Device purchaser photograph
2. Device purchaser friends photograph
3. Device purchaser pet photograph
4. Favorite Singer
5. Landscape The device 30 can store in a memory thereof a non-rewritable or rewritable album. A music distributor can use the device as a self-playing music album, or self-playing photo or video album. A user can select an album at a retail store and download over the Internet, and print the album graphics on the card using standard card printers.

Figure 28:
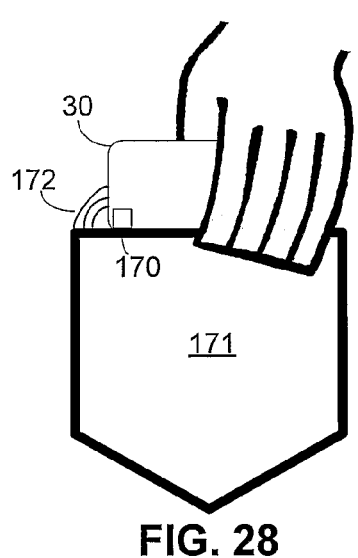
FIG. 28 is a plan view of a device having a sensor to detect removal of the device.

FIG. 28 is a top front view of a device 30 according to another embodiment of the current invention having a sensor 170 that is able to detect whether the device 30 is removed from the owner's possession, illustrated in the figure as its being taken out of the user's pocket 171. The device can be switched in sleep mode or switched off once inside the pocket. Once switched on, the device starts sending RF signals 172. Similarly the device can be switched off when not carried in an employee badge clip or when laid on a surface and vice versa thereby saving current consumption of the device.

Figure 29:
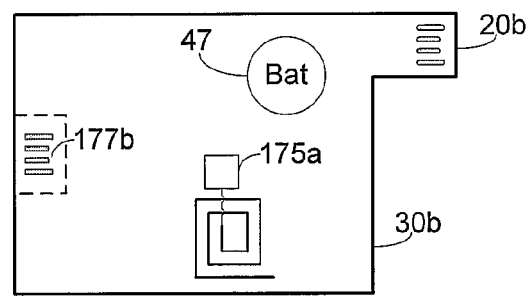
FIG. 29 is a plan view of two devices with the ability to communicate with one another.
Figure 29:
Figure 29:
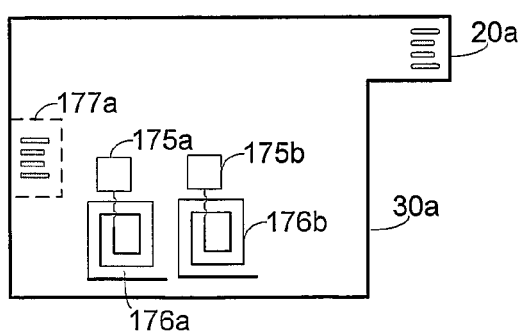

FIG. 29 is a top front view showing a pair of devices 30a and 30b according to another embodiment of the invention that are adapted for mutual communicate. Both devices carry:

Double sided male USB connector 20a and 20b respectively.
RF modules 175a, 175b connected to respective coil antennas 176a, 176b.
USB compliant receptacles 177a, 177b that can be made thin enough to enable insertion of the double sided male USB connectors 20a and 20b.

Each device can have USD flash drive functionality, MP3 player functionality, photo album functionality or similar. At least one of the devices needs to have a power source such as a battery 47. The device 30a can be connected to device 30b by plugging the connector 20a into the USB compliant receptacle 177b, thereby permitting:
a) Transfer of files between both devices;
b) Transfer of the entire content of one device to the other device
c) Recharging the other device
d) Supply of power to the other device
e) Use the RF signal strength to estimate the distance between device 31a and device 31b
f) Use both the RF modules 175a and 175b to triangulate the position of the device 30a relative to that of the device 30b.

Operations a-b can also be performed without physically coupling the two devices by means of RF communication using the RF modules 175a, 175b and antennas 176a and 176b. Each device has a suitable interface and display (not shown) to control the operation.

Figure 30:
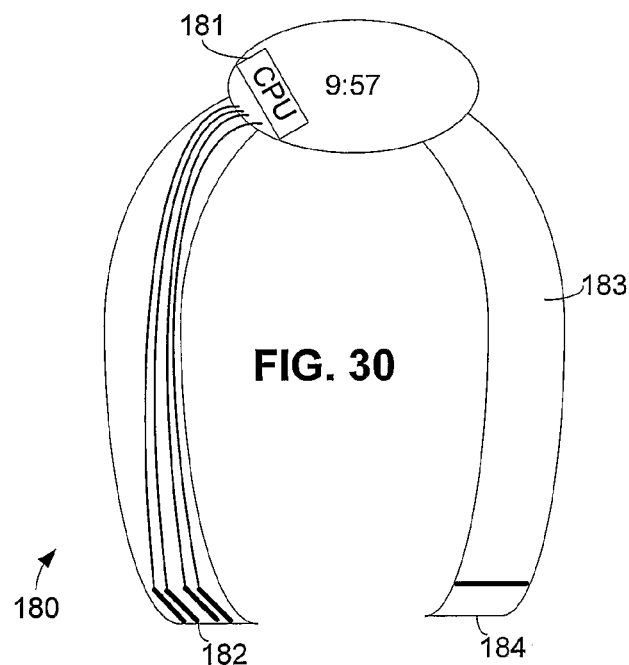
FIG. 30 is a pictorial view of a flexible device according to an embodiment of the invention in the form of a wrist watch or pendant carrying a USB connector.

FIG. 30 shows pictorially a flexible device 180 according to another embodiment of the invention in the form of a wrist watch or pendant carrying an electronic circuit 181 and a USB connector 182 fitted to one end of a flexible strap 183 such as a bracelet or a necklace. A clasp 184 may be mounted at the opposite end of the strap 183 and dimensioned to accommodate the USB connector 182. The electronic circuit 181 may be adapted to operate when the clasp 184 is engaged with the USB connector 182 and may include a communication circuit for communicating with an external device. Flexible strap 183 can have electric connections to enable data and power communication between said connector 182 and electronic circuit 181.

While various embodiments of the invention have been described, the description is not intended to limit the scope of the invention to the particular form set forth, but on the contrary, it is intended to cover such alternatives, modifications, and equivalents as may be included within the spirit and scope of the invention as defined by the appended claims.

For example, although many features of the invention have been described with particular regard to a double sided USB male connector, it will be appreciated that they can be applied also to single sided USB connectors. For example, the need to prevent short circuiting between contacts of a USB receptacle on inserting the USB male connector therein derives principally from the possibility of being able to insert the USB male connector either way into the USB receptacle. But this feature is equally relevant when a single sided USB male connected can be inserted either way into a USB receptacle as is the case in many of the card-like applications. Thus, for example, the invention equally contemplates a single sided USB male connector having means to prevent an electric short circuit between contacts of a USB receptacle on inserting the USB connector therein.

Likewise, many of the devices have been described with regard to card-like devices having a planar substrate that is suitable for carrying in a wallet. However, the invention also contemplates that the same functionalities can be realized using other configurations. For example, many of the devices can be implemented on disk-on-key type devices that may be carried in a pocket or worn on one's person, for example round a person's neck or in the form of a wrist-mounted device having one or more USB or similar connectors.

In the following claims, reference to FCCS connector relates to any connector that is adapted for use with "flexibly connectable computer systems" used to denote any interface standard for allowing devices to be connected to a computer. USB-compatible connectors are an example of such a connector, another example is the IEEE 1394 standard. Likewise, wherever the term FCCS or USB is used in the claims, this is intended to embrace USB-compatible connectors and embraces both standard and mini-USB type connectors.

The invention claimed is:

1. A multi-contact connector supporting on opposite surfaces first and second sets of mutually opposed contacts wherein corresponding contacts in each set are electrically interconnected and are spatially aligned in a mutually opposed relationship allowing the connector to be connected in two opposed orientations to a corresponding FCCS-compatible receptacle supporting on an internal surface thereof a multi-contact data connector having only a single set of contacts that is compatible to either one of said sets of contacts such that identical functionality is obtained regardless of the orientation of the connector within the receptacle, said connector further comprising a short circuit prevention device to prevent an electric short circuit between contacts of the receptacle on inserting the connector therein.

2. The connector according to claim 1, wherein the first and second sets of contacts are supported on a planar substrate.

3. The connector according to claim 2, wherein the planar substrate is formed of a material that is sufficiently resilient to bend to a curvature radius of less than 50 cm without losing electrical or mechanical functionality.

4. The connector according to claim 1, being USB-compatible or mini-USB compatible.

5. The connector according to claim 1, wherein said short circuit prevention device is a diode.

6. The connector according to claim 1, further comprising a switching unit to conduct an electric current only if there is no electric short circuit between the anode and the cathode.

7. The connector according to claim 1, being adapted for connection to an earphone.

8. A female connector adapted for accommodating the connector according to claim 1.

9. A portable device comprising an electronic circuit coupled to the connector according to claim 1.

10. The portable device according to claim 9, further comprising a power source.

11. The portable device according to claim 9, further comprising a communication circuit for communicating with an external electronic device.

12. The portable device according to claim 9, wherein the communication circuit is adapted to enable access to the external electronic device.

13. The portable device according to claim 9, having a planar substrate supporting the connector and supporting a magnetic stripe.

14. The portable device according to claim 9, being formed of a material and being dimensioned to be compatible with a standard credit card.

15. The portable device according to claim 9, further comprising electronic contacts to communicate with a smart card.

16. The portable device according to claim 9, further comprising a display device for displaying visual information.

17. The portable device according to claim 9, further comprising an audio play unit for playing audio information.

18. The portable device according to claim 9, wherein the electronic circuit includes an authentication unit for authenticating the device.

19. The portable device according to claim 9, further comprising a biometric sensor.

20. The portable device according to claim 9, further comprising an imaging device for capturing visual information.

21. The portable device according to claim 9, further comprising a transducer for capturing audio information.

22. The portable device according to claim 9, further comprising at least one transducer for capturing electro-physiological information.

23. The portable device according to claim 9, further including a user interface for receiving user input.

24. The portable device according to claim 9, wherein the electronic circuit includes a flash memory.

* * * * *